United States Patent Office 2,881,160
Patented Apr. 7, 1959

2,881,160
BIS-ISOXAZOLYL-AZOBENZENE-DERIVATIVES

Reinhard Schläpfer and Hans Spiegelberg, Basel, Switzerland, assignors to Hoffmann-La Roche Inc., Nutley, N.J., a corporation of New Jersey No Drawing. Application November 23, 1956
Serial No. 623,764

Claims priority, application Switzerland
November 30, 1955

2 Claims. (Cl. 260—157)

The present invention relates to novel azobenzene derivatives and salts thereof as well as to a process for the preparation of these compounds.

The novel azobenzene derivatives of the present invention correspond to the following general formula

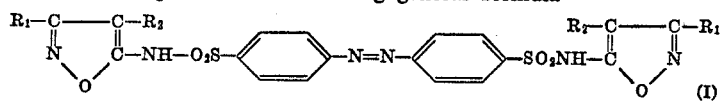

wherein each of the symbols $R_1$ and $R_2$ represents a member selected from the group consisting of hydrogen, alkyl and alkoxyalkyl radicals.

The azobenzene derivatives represented by the above formula have valuable chemotherapeutic properties and are useful as bacteriostatic agents for controlling pathogenic micro-organisms, such as Gram-positive and Gram-negative bacteria causing general infections and, in particular, infections of the urogenital system, e.g. streptococci, staphylococci, pneumococci, gonococci, meningococci, E. coli, B. proteus and B. pyocyaneus.

The process according to this invention comprises reacting an isoxazole compound having the general formula

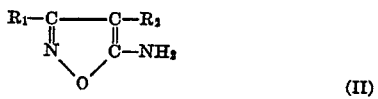

wherein each of the symbols $R_1$ and $R_2$ represents a member selected from the group consisting of hydrogen, alkyl and alkoxyalkyl radicals, with an azobenzene-4,4'-disulfonic acid dihalide.

Among the starting compounds represented by the general Formula II the substituted isoxazole compounds are partly known. As far as their manufacture has not been described in the literature, they can be prepared from corresponding nitriles and hydroxylamine by a reaction similar to that which results in the formation of 3,4-dimethyl-5-amino-isoxazole from acetropropionitrile and hydroxylamine.

Starting componds which may be used for carrying out the process of this invention include, e.g. 3,4-dimethyl-5-amino-isoxazole and azobenzene-4,4'-disulfonic acid dichloride.

The starting compounds are conveniently used in a molar ratio of about one mole of azobenzene-4,4'-disulfonic acid dihalide to about two moles of the isoxazole compound. It is advantageous to add an acid-binding agent, such as pyridine or alkyl pyridines, e.g. picolines, to the reaction mixture. Since pyridine and its homologues not only possess acid-binding properties but are also good solvents for the starting materials and the reaction product, they are particularly suitable as auxiliary agents in the present process.

The final products obtained by the process of the present invention can be precipitated in the form of orange-red dyestuffs by means of an acid, after separation of the excess acid-binding agent from the reaction mixture and addition of water. These dyestuffs are sparingly soluble in water and in dilute acids but readily soluble in a basic medium. They form water-soluble salts with strong organic and inorganic bases, such as e.g. alkali metal hydroxides, alkaline earth metal hydroxides, diethanolamine and similar bases.

The azobenzene derivatives of this invention can be converted into other chemotherapeutically active compounds by reductive cleavage at the azo group.

The invention will now be illustrated by the following example without being limited thereto.

Example 74 g. of azobenzene-4,4'-di-sulfochloride were introduced portionwise, with exclusion of humidity, into a solution of 40 g. of 3,4-dimethyl-5-amino-isoxazole in 500 ml. of pyridine. The reaction mixture was stirred at 70° C. for 8 to 12 hours, and the pyridine was subsequently evaporated in the vacuum of a water jet pump. Residual pyridine was then removed from the residue by azeotropic distillation with water, and the residue was taken up in 800 to 1200 ml. of 2 N caustic soda solution, whereby the reaction product dissolved in the form of its di-sodium salt. The solution was filtered by suction through a carbon filter until it became clear and was then made acid to Congo by the addition of mineral acid. This gave rise to the separation of a voluminous orange-red azo dyestuff which, on standing, turned into a granular form capable of being filtered by suction. The dyestuff was separated by suction, and the filter cake was washed several times with water. After drying there were obtained 93 g. of p,p'-bis[(3,4-dimethyl-isoxazolyl-5) - aminosulfonyl]-azobenzene. After recrystallisation from 80% alcohol the compound melted at 209–211° C.

We claim:

1. A compound selected from the group consisting of azobenzene derivatives having the general formula

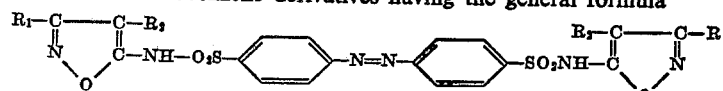

wherein each of the symbols $R_1$ and $R_2$ represents a member selected from the group consisting of hydrogen and methyl, and water-soluble salts thereof with strong bases.

2. p,p' - Bis[(3,4 - dimethyl - isoxazolyl-5)-amino-sulfonyl]-azobenzene.

References Cited in the file of this patent
UNITED STATES PATENTS

| | | |
|---|---|---|
| 2,123,634 | Mietzsch et al. | July 12, 1938 |
| 2,321,891 | Berchet | June 15, 943 |
| 2,430,094 | Wuest et al. | Nov. 4, 1947 |
| 2,512,525 | Harmon | June 20, 1950 |

FOREIGN PATENTS

| | | |
|---|---|---|
| 876,296 | France | July 27, 1942 |

UNITED STATES PATENT OFFICE

CERTIFICATE OF CORRECTION

Patent No. 2,881,160                                          April 7, 1959

Reinhard Schläpfer et al.

It is hereby certified that error appears in the printed specification of the above numbered patent requiring correction and that the said Letters Patent should read as corrected below.

Column 1, line 59, for "acetropropionitrile" read -- acetopropionitrile --; column 2, lines 54 and 55, upper right-hand portion of the formula, for "$R_2-C-C-R$" read -- $R_2-C-C-R_1$ --; line 67, list of references cited, under "UNITED STATES PATENTS", for "June 15, 943" read -- June 15, 1943 --.

Signed and sealed this 4th day of August 1959.

(SEAL)

Attest:

KARL H. AXLINE                                                    ROBERT C. WATSON

Attesting Officer                                              Commissioner of Patents